(12) United States Patent
Xu et al.

(10) Patent No.: US 9,755,433 B2
(45) Date of Patent: Sep. 5, 2017

(54) HYBRID ALTERNATING CURRENT (AC)/DIRECT CURRENT (DC) DISTRIBUTION FOR MULTIPLE-FLOOR BUILDINGS

(71) Applicant: ABB Technology AG, Zurich (CH)

(72) Inventors: Jing Xu, Cary, NC (US); Zhenyuan Wang, Morrisville, NC (US); Waqas Arshad, Raleigh, NC (US); Joseph A. Carr, Raleigh, NC (US)

(73) Assignee: ABB Schweiz AG (CH)

( * ) Notice: Subject to any disclaimer, the term of this patent is extended or adjusted under 35 U.S.C. 154(b) by 714 days.

(21) Appl. No.: 14/085,764

(22) Filed: Nov. 20, 2013

(65) Prior Publication Data

US 2015/0137595 A1    May 21, 2015

(51) Int. Cl.
| | |
|---|---|
| H02J 1/10 | (2006.01) |
| H02J 3/38 | (2006.01) |
| H02J 9/00 | (2006.01) |
| H02J 4/00 | (2006.01) |
| H02J 1/12 | (2006.01) |
| H02J 9/06 | (2006.01) |

(52) U.S. Cl.
CPC ........ *H02J 4/00* (2013.01); *H02J 1/12* (2013.01); *H02J 9/06* (2013.01); *Y10T 307/344* (2015.04)

(58) Field of Classification Search
CPC ...... H02J 9/061; H02J 9/06; H02J 7/35; H02J 9/062; H02J 7/0068; H02J 7/34; H02J 7/007; H02J 3/32; H02J 7/345; H02J 3/383; H02J 4/00; H02J 7/0052; H02J 1/10; H02J 3/00; H02J 3/38; H02J 3/382

USPC ..................................................... 307/23, 26
See application file for complete search history.

(56) References Cited

U.S. PATENT DOCUMENTS

| | | | |
|---|---|---|---|
| 2,920,241 A | 1/1960 | Jacobs, Jr. et al. | |
| 6,295,215 B1 * | 9/2001 | Faria ....................... | H02J 9/062 363/124 |

(Continued)

FOREIGN PATENT DOCUMENTS

| | | |
|---|---|---|
| CN | 103 178 553 A | 6/2013 |
| EP | 0 932 237 A2 | 7/1999 |

(Continued)

OTHER PUBLICATIONS

Notification of Transmittal of the International Search Report and the Written Opinion of the International Searching Authority, or the Declaration for International Application No. PCT/US2014/056692 (Apr. 8, 2015).

(Continued)

*Primary Examiner* — Jared Fureman
*Assistant Examiner* — Esayas Yeshaw
(74) *Attorney, Agent, or Firm* — Taft, Stettinius & Hollister LLP (57) ABSTRACT

A hybrid alternating current (AC)/direct current (DC) distribution system for multiple-floor buildings includes per-floor rectifiers for converting supply side AC to DC. Each rectifier is configured to supply a plurality of DC loads associated with one floor of a multiple-floor building. The system further includes per-floor DC busses, each of the DC busses being configured to distribute the DC to the DC loads its respective floor. The system further includes at least one AC bus for supplying AC power to AC loads in the building.

23 Claims, 4 Drawing Sheets

(56) References Cited

U.S. PATENT DOCUMENTS

| | | | |
|---|---|---|---|
| 6,492,747 B1 | 12/2002 | Hoffmann | |
| 7,893,559 B2* | 2/2011 | Petersen | B63H 23/24 |
| | | | 307/30 |
| 7,932,621 B1 | 4/2011 | Spellman | |
| 8,049,366 B2* | 11/2011 | Shyu | H02J 7/35 |
| | | | 307/66 |
| 8,106,533 B1 | 1/2012 | Johnson | |
| 9,300,171 B2* | 3/2016 | Moth | H02J 9/062 |
| 2004/0027734 A1 | 2/2004 | Fairfax et al. | |
| 2006/0043797 A1* | 3/2006 | Hjort | H02J 7/0047 |
| | | | 307/46 |
| 2007/0029879 A1 | 2/2007 | Eldredge | |
| 2009/0251072 A1 | 10/2009 | Barnett et al. | |
| 2010/0292853 A1* | 11/2010 | McDonnell | H02J 3/34 |
| | | | 700/287 |
| 2011/0006607 A1 | 1/2011 | Kwon et al. | |
| 2011/0148213 A1 | 6/2011 | Baldwin et al. | |
| 2011/0187197 A1 | 8/2011 | Moth | |
| 2011/0217615 A1* | 9/2011 | Smith | H01M 8/04223 |
| | | | 429/452 |
| 2012/0181865 A1* | 7/2012 | Muthu | H02J 1/08 |
| | | | 307/26 |
| 2013/0099567 A1* | 4/2013 | Pfitzer | H01H 21/24 |
| | | | 307/29 |
| 2013/0200714 A1 | 8/2013 | Pan et al. | |
| 2014/0060100 A1* | 3/2014 | Bryson | H02J 3/385 |
| | | | 62/235.1 |
| 2014/0293669 A1 | 10/2014 | Fornage | |
| 2015/0021988 A1* | 1/2015 | Barnetson | H05B 33/0803 |
| | | | 307/23 |
| 2015/0092311 A1 | 4/2015 | Wang et al. | |
| 2015/0207316 A1 | 7/2015 | Saussele et al. | |

FOREIGN PATENT DOCUMENTS

| | | |
|---|---|---|
| EP | 0 932 237 B1 | 8/2006 |
| GB | 2 275 378 A | 8/1994 |
| GB | 2 450 534 A | 12/2008 |
| JP | H02 164236 A | 6/1990 |
| WO | WO 2009/124227 A1 | 10/2009 |
| WO | WO 2011/033352 A1 | 3/2011 |

OTHER PUBLICATIONS

Restriction/Election Requirement for U.S. Appl. No. 14/042,594 (May 26, 2015).

Non-Final Office Action for U.S. Appl. No. 14/139,728 (Jun. 14, 2016).

Notice of Allowance and Fee(s) Due for U.S. Appl. No. 14/042,594 (Aug. 14, 2015).

* cited by examiner

HYBRID ALTERNATING CURRENT (AC)/DIRECT CURRENT (DC) DISTRIBUTION FOR MULTIPLE-FLOOR BUILDINGS

TECHNICAL FIELD

The subject matter described herein relates to an electrical power distribution system for multiple-floor buildings. More particularly, the subject matter described herein relates to a hybrid AC/DC distribution system for multiple-floor buildings.

BACKGROUND

Currently, the power distribution network in most countries is a single phase or three phase AC network. However, with the proliferation of power electronics based loads, which are powered by DC, it is desirable to efficiently and reliably distribute DC power to such loads. In particular, in commercial buildings, it is desirable to efficiently and reliably distribute DC to loads on a per-floor basis.

Existing distribution systems utilize either a central rectifier to rectify AC to DC at the building entry point and/or use rectifiers at each power outlet. Without some protection measures, a centralized rectifier that serves an entire building is a single point of failure that can result in loss of DC power to the entire building. Another approach provides a rectifier at each power outlet. Such an approach is unduly costly as it can require hundreds or thousands of rectifiers for a building.

In light of these difficulties, there exists a need for a hybrid AC/DC distribution system for multiple floor buildings.

SUMMARY

A hybrid alternating current (AC)/direct current (DC) distribution system for multiple-floor buildings includes per-floor rectifiers for converting supply side AC to DC. Each rectifier is configured to supply a plurality of DC loads associated with one floor of a multiple-floor building. The system further includes per-floor DC busses, each of the DC busses being configured to distribute the DC to the DC loads its respective floor. The system further includes at least one AC bus for supplying power to AC loads in the building.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
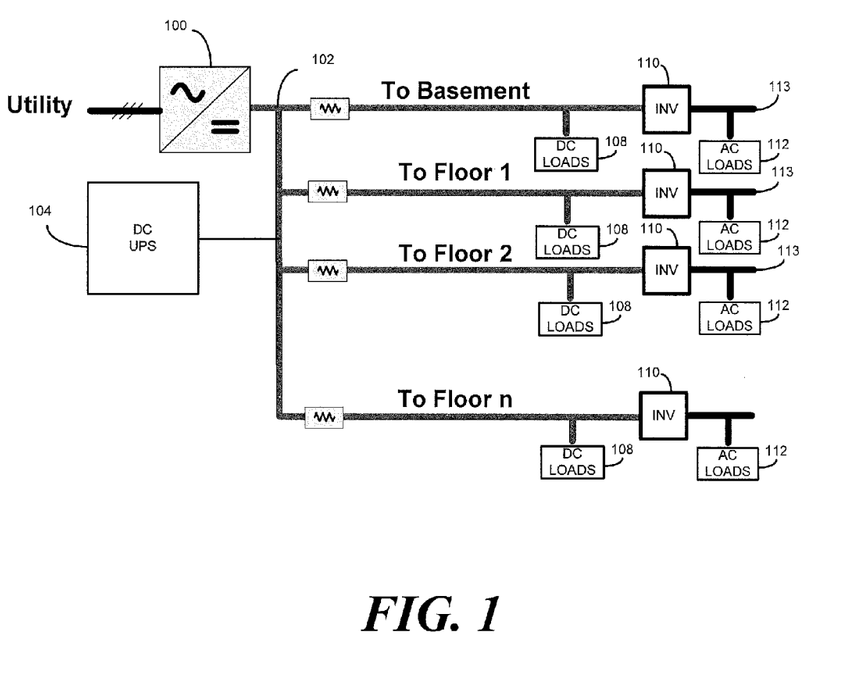
FIG. 1 is a schematic diagram of a hybrid AC/DC distribution system for multiple floor buildings according to an embodiment of the subject matter described herein.

The subject matter described herein includes a hybrid AC/DC distribution system for multiple-floor buildings. FIG. 1 is a schematic diagram illustrating a centralized approach for supplying DC to multiple-floors in a building. In FIG. 1, a utility supplies three phase AC power to the building. A centralized rectifier 100 converts the AC to DC and supplies the DC to each floor in the building via a DC bus 102. A DC uninterruptible power supply (UPS) 104 is coupled to the DC bus to maintain a predetermined voltage level on the DC bus. DC loads 108 are coupled to the DC bus in each floor in the building. Each floor may supply plural DC loads using a single bus, which is less cumbersome than converting AC to DC at each outlet on each the floor.

Although in the illustrated example DC UPS 104 is centralized, in an alternate implementation, a DC UPS may be located on each floor to maintain the DC bus voltage on each floor in the event of a power interruption. Thus, centralized AC/DC rectification with per-floor DC UPSs intended to be within the scope of the subject matter described herein.

Each floor may also include an inverter 110 for converting the direct current on the DC bus to alternating current for powering AC loads 112 on each floor. An AC bus 113 may emanate from each inverter 112 to distribute the AC to the AC loads on each floor.

In an alternate embodiment, inverter 110 may be centralized and separate AC and DC buses may be run to each floor. In the embodiment illustrated in FIG. 1, the DC distribution network throughout the building has less loss than a traditional AC distribution network because the DC distribution network may use a higher DC voltage level than current 110 V or 220 V AC systems. For example, the system illustrated in FIG. 1 may be used to distributed low voltage DC of 1 kilovolt. However, the subject matter described herein is not limited to supplying DC voltages of 1 kV to each floor. Supplying any DC voltage to each floor in a multiple floor building is intended to be within the scope of the subject matter described herein.

Loss is also less in a DC distribution system than in an AC distribution system because only resistive losses are present in the DC distribution system versus inductive losses which occur in the AC distribution system. Furthermore, a central rectifier has a higher required power rating and can achieve higher energy efficiency than 110V or 220V AC systems. The central rectifier has higher efficiency because its power is higher that the rectifier in power electronics based loads. The distribution network illustrated in FIG. 1 is suitable for new buildings with power electronics based loads. However, the reliability of the central rectifier based distribution system is dependent on the reliability of the central rectifier that provides the DC supply to the entire building. The UPS increases the reliability of the system illustrated in FIG. 1.

Figure 2:
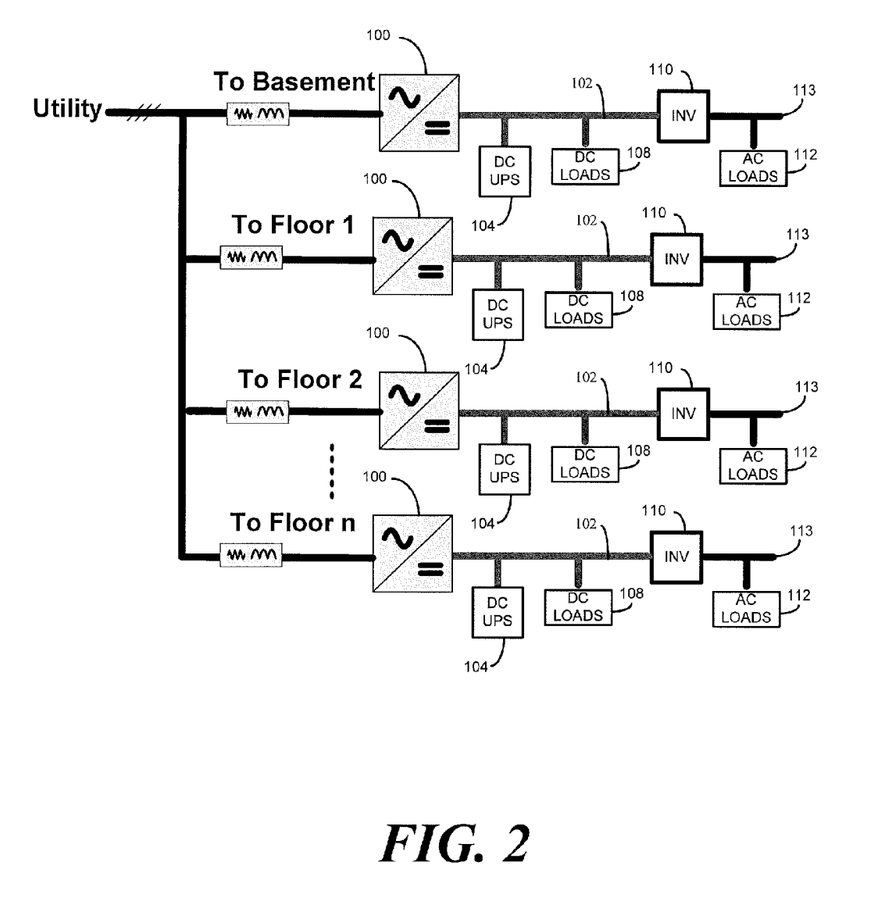
FIG. 2 is a schematic diagram of a hybrid AC/DC distribution system for multiple floor buildings according to another embodiment of the subject matter described herein.

FIG. 2 illustrates an alternate embodiment of the subject matter described herein with per-floor rectifiers 100 that rectify AC to DC at each floor. Each floor has its own DC bus 102 that supplies plural DC loads 108 on each floor. Each floor also includes its own UPS 104 which maintains the DC voltage on each floor in the event of an AC power interruption. Each floor also includes a per-floor inverter 110 that converts the DC on the DC bus to AC for powering AC loads on each floor.

In the embodiment illustrated in FIG. 2, the rectifiers can be referred to as a distributed rectifier. The distributed rectifier converts AC to DC at the floor level. The power distribution from the main surface panel to each distribution panel on the floor is AC. The reliability of the system is higher than the DC distribution system in FIG. 1 which has a central rectifier because each floor is supplied by a separate rectifier. The inverters on each floor allow existing AC loads to be powered. When a fault occurs on the DC bus of one floor, energy flowing from other floors is controlled by the rectifier on that floor and cannot feed back to the floor at fault, making protection of the whole system easier. A protection device, such as an AC circuit breaker, may be located on each floor. The protection device is less expensive than DC protection devices that have to endure the higher DC bus voltage and break higher peak fault current. One disadvantage of the system illustrated in FIG. 2 is that there is higher cable loss from the cable between the main service panel and the distribution panels on each floor than a pure DC distribution system because inductive losses occur on the cable.

It should be noted that in FIGS. 1 and 2, the single line representing the DC distribution to each floor may consist of several feeders that form a mini DC network. Thus, each floor may include a DC bus that includes a plurality of conductors without departing from the scope of the subject matter described herein.

It should also be noted that in FIG. 2, inverters 110 are utilized to convert DC to AC for powering AC loads within the building. In an alternate implementation, inverters 110 may be omitted, and AC loads may be powered using a connection to an external AC power supply, such as the building's existing connection to the AC Power grid and existing AC wiring within the building.

Figure 3:
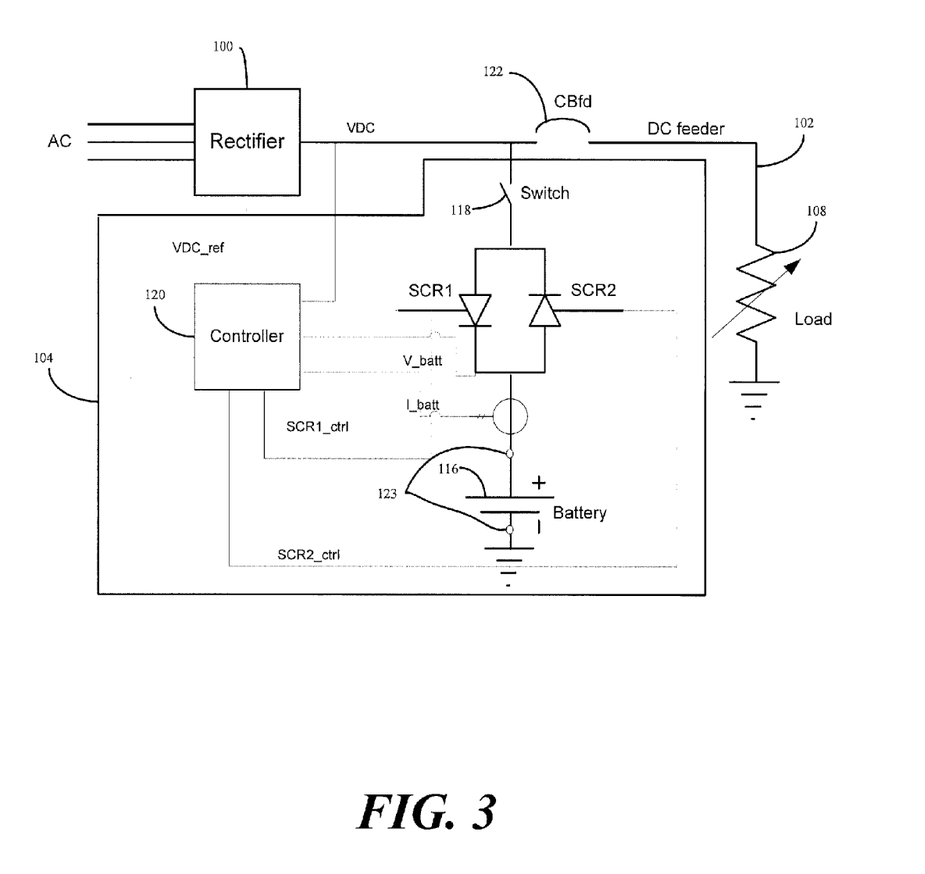
FIG. 3 is a schematic diagram illustrating a DC uninterruptible power supply of a hybrid AC/DC distribution system for multiple floor buildings according to an embodiment of the subject matter described herein.

As stated above, because some loads may be critical, a UPS that maintains a DC voltage level on each floor is desired. FIG. 3 is an example of a low cost UPS solution to provide backup power to DC feeders for the systems illustrated in FIGS. 1 and 2. Referring to FIG. 3, UPS 104 includes a battery 116 that is not directly connected to DC bus 102, which reduces charging loss. Rather, battery 116 is connected to DC bus 102 through a pair of silicon controlled rectifier (SCR) devices SCR1 and SCR2 and a switch 118. A controller 120 controls the charging of battery 116 in the connection of battery 116 to DC bus 102. Controller 120 may be a component of UPS 104, of rectifier 100, and/or a centralized controller that controls UPS(s) 104, rectifier(s) 100, and inverter(s) 110.

In the illustrated example, controller 120 measures the output voltage of rectifier 100 (VDC), the battery voltage (V_batt) and the battery current (I_batt) determines the appropriate reference voltage VDC_ref and the charging/discharging signal supplied to SCR1 and SCR2. Switch 118 connecting SCR1 and SCR2 to the DC bus is used for isolation purposes. A circuit breaker is not needed within rectifier 100 because the DC feeder protection circuit breaker 122 may protect UPS 104 from a DC feeder fault.

DC feeder loads, due to their plug and play nature, can be thought of as a variable aggregated load. Battery 116 may be of a portable design so that battery 116 can be replaced quickly. This is especially useful in the case of a DC bus fault between the rectifier output and circuit breaker 122, which is extremely rare but may occur. If this fault occurs while battery 116 is discharging through SCR2, the fault current cannot extinguish until the energy in battery 116 depletes, which may damage battery 116. UPS 104 may include a battery connector 123 configured to connect to the terminals of battery 116 and to disconnect from the terminals of battery 116 when battery 116 is being replaced. Accordingly, providing a portable battery that can be replaced is desirable.

The following describes the operation of controller 120. Initially, controller 120 functions in a pre-charge state to pre-charge battery 116. In the pre-charge state since the battery charging current from rectifier 100 is solely determined by the voltage difference between VDC and V_batt, to limit the maximum charging current, battery 116 should be pre-charged to a separate voltage level before closing circuit breaker 122. The voltage level should be the minimum DC feeder voltage VDC_min that the DC loads can accept. This would require a wide output voltage range of rectifier 100, which is achievable using insulated gate bipolar transistors (IGBT) or SCR based rectifiers. This may also require an interlock mechanism between circuit breaker 122 control and V_batt measurement—when V_batt is greater than VDC_min, circuit breaker 122 closing may be enabled. In practice, this can be implemented as an automated control of circuit breaker 122 from controller 120.

When the load is light, controller 120 may enter a charging state. The lightness of the load may be measured by various methods, such as measuring ripples in VDC. The charging current can be controlled by giving the proper VDC_ref to V_batt so that neither SCR1 nor rectifier 100 will be overloaded. In constant voltage charging, the charging current is determined by the voltage difference between the DC bus voltage (VDC) and V_batt. If the difference between VDC and V_batt is too much, the higher charging current may exceed the capability of SCR and rectifier, especially rectifier is supplying load in the during charging of the battery. The rectifier controls VDC based on the value of VDC_ref, so the charging current is limited by different values of VDC_ref.

When V_batt is charged to the desired voltage level, VDC_ref can be temporarily lowered so the charging current through SCR1 can be terminated.

When AC power is lost, controller 120 may enter emergency state. Controller 120 will detect the loss of AC power when VDC on DC bus 102 decreases below a predetermined level. When this occurs, controller 120 may turn on SCR2 to supply the load and at the same time give a zero VDC_ref signal, indicating the mode of UPS operation. During this emergency operation, VDC is not controlled. The discharging of battery 116 will terminate when AC power is restored and rectifier 100 overrides VDC_ref with a maximum VDC reference value. Controller 120 will sense the recovered VDC, and discharging of battery 116 through SCR2 will terminate automatically. If AC power is not restored and battery 116 depletes so that VDC decreases to VDC_min, controller 120 may trip circuit breaker 122 and SCR2 will automatically shut off.

After AC power is restored from an emergency situation, controller 120 enters a recovery state. In the recovery state, if V_batt is lower than a certain threshold voltage, rectifier 100 will work at is maximum power capability to supply load as well as to charge battery 116 to VDC_min.

Under normal load conditions, controller 120 may control UPS 104 to operate in a battery idle condition. In the battery idle condition, neither SCR1 nor SCR2 will conduct, isolating battery 116 from the DC bus. Controller 120 will output a zero VDC_ref signal so that rectifier 100 can override the signal with a maximum VDC reference value and the battery system loss is only the auxiliary power of the controller. If controller 120 is used to control rectifier 100 and UPS 104, the rectifier/UPS system loss can be minimized.

Under heavy loading conditions, controller 120 may operate in a supplemental discharging mode. When the load becomes heavy, as measured by various methods, and if V_batt is sufficiently high, controller 120 may turn on SCR2 by giving a proper VDC_ref to rectifier 100 so a controlled discharging current from battery 116 can help reduce the ripple in VDC.

Figure 4:
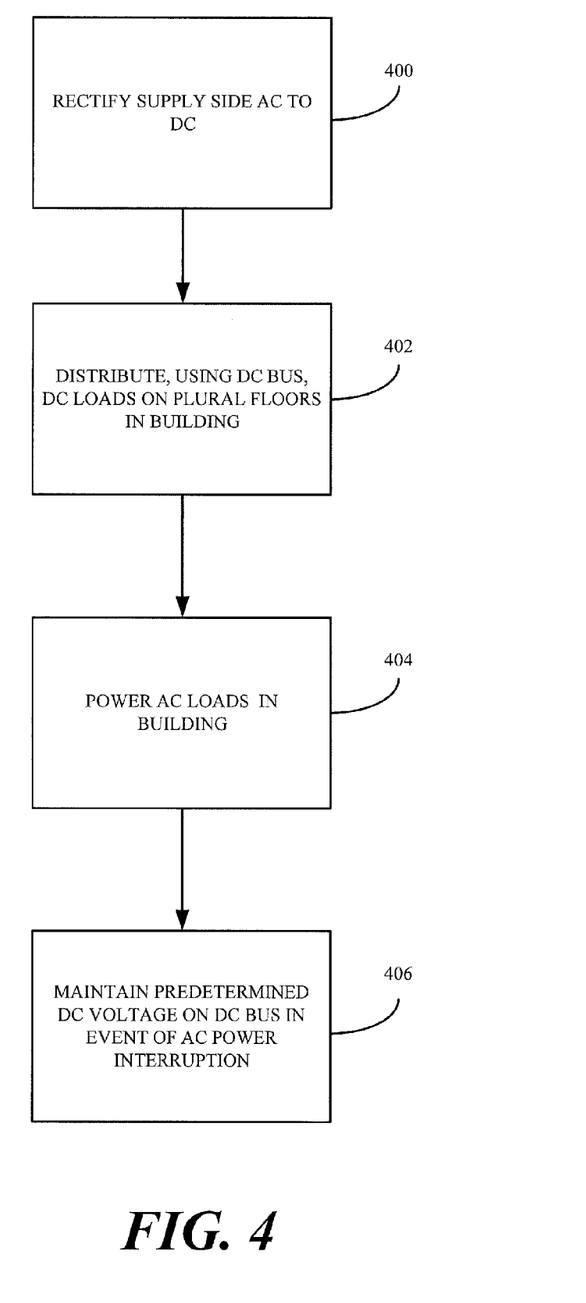
FIG. 4 is a flow chart illustrating exemplary steps of a hybrid AC/DC distribution method for multiple floor buildings according to an embodiment of the subject matter described herein.

FIG. 4 is a flow chart illustrating an exemplary AC/DC distribution method for multiple-floor buildings according to an embodiment of the subject matter described herein. The steps illustrated in FIG. 4 may be performed by the components described above and/or alternative components.

Referring to FIG. 4, in step 400, the method includes rectifying supply side AC to DC. The rectifying can be performed by a centralized rectifier as illustrated in FIG. 1 or per-floor rectifiers, as illustrated in FIG. 2. The rectifying can be controlled by a controller, such as controller 120 that is internal to or external from rectifier 100.

In step 402, the method includes distributing, using at least one DC bus, the DC to a plurality of DC loads on a plurality of floors in a multiple floor building. The distributing may be effected by a single DC bus emanating from a central rectifier or a plurality of per-floor DC busses emanating from per-floor rectifiers. The rectifying can be controlled by a controller, such as controller 120 that is internal to or external from rectifier 100.

In step 404, the method includes powering AC loads in the building. Powering the AC loads may include converting the DC on the at least one DC bus to AC for powering the AC loads in the building. The converting can be achieved by inverters 110, which may be centralized or distributed per-floor in a multiple floor building. Inverters 110 may be controlled by internal or external controllers, such as controller 120. In an alternate implementation, the powering of the loads can be achieved through a connection to an external AC power supply, such as the existing connection to the AC power grid and the existing AC wiring within the building.

In step 406, the method includes maintaining a predetermined DC voltage on the at least one DC bus in the event of an AC power interruption. The DC bus voltage may be maintained during AC power interruptions by per-floor or centralized DC UPSs, such as DC UPS 104 under control of controller 110.

Exemplary Applications

One exemplary application of this invention is to provide a DC distribution system to a multiple floor building, where a building can be a commercial building, a residence, or a ship. As photovoltaic (PV) power and light emitting diode (LED) lighting become more prevalent in building applications, it is possible to use DC power distribution inside the building to reduce extra energy conversion steps in the distribution system. However, there are some loads cannot be connected to DC distribution system directly in the near future. Thus, a hybrid AC/DC distribution (with distributed rectifiers) is one of the possible distribution systems for buildings. In both pure DC and hybrid AC/DC distribution systems, the rectifier is an important component to convert AC power from grid to DC power inside the building.

There are several possible locations of the rectifier in a multiple floor building. FIGS. 1 and 2 illustrate two rectifier location scenarios and their pros/cons. These scenarios include the "Central Rectifier" and the "Distributed Rectifier".

In the "Distributed Rectifier" location case, a low cost DC UPS solution is proposed to dual-use the rectifiers. Since the rectifier is required to regulate the output DC voltage, simple diode bridge rectifiers may not be used, and an IGBT or SCR based rectifier has to be used.

Problems Addressed in Whole or in Part

DC distribution systems for different types of buildings/homes have been proposed. Conventional systems require that AC power from grid is converted to DC power through a rectifier, and different renewable energy sources and energy storage devices are connected to DC bus. Both AC and DC loads are supplied by DC power throughout the building/home. However, the efficient and reliable mechanisms for distributing AC and DC power to multiple floors in a multiple floor building illustrated herein are not present in conventional systems.

In a multiple floor building, power is distributed to each floor. The floor may have several feeders, and they form a mini-DC distribution system. On the overall level, depending on the placement of the rectifier(s), the reliability and controllability of the DC distribution building is quite different. The subject matter described herein includes a hybrid AC/DC distribution system with distributed rectifiers on each floor instead of one central rectifier as presented in other publications. The subject matter described herein further includes a low cost DC UPS solution that:

- Dual-uses the rectifier for both charging of the battery of the UPS and rectification of the current from AC to DC to be supplied to each floor
- Can save a DC circuit breaker connecting the DC UPS
- Can use two low cost SCR devices instead of a DC-DC converter
- Can potentially dual-use the rectifier controller as the DC UPS controller Advantages Exemplary advantages of the hybrid AC/DC distribution system for multiple floor buildings described herein include:
- High efficiency
- High reliability
- Easy to retrofit from existing AC buildings
- Well controlled energy flow and easier protection solutions Exemplary advantages of the proposed low cost DC UPS include:
- Lower cost due to the savings of circuit breaker and DC-DC converter
- High efficiency due to the SCR isolated battery in UPS idle mode Additional Features Possible additional features of the subject matter described herein include:

Protection of the low cost DC UPS can be achieved by adding a low cost fuse in series with the isolation switch (switch 118 illustrated in FIG. 3).

The low cost DC UPS concept can also apply to the "central rectifier" scenario and other DC network applications (see UPS 104 illustrated in FIG. 1).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A hybrid alternating current (AC)/direct current (DC) distribution system for multiple-floor buildings, the system comprising:
   a plurality of per-floor rectifiers for converting supply side AC to DC, each rectifier being configured to supply a plurality of DC loads associated with one floor of a multiple-floor building;
   a plurality of per-floor DC busses, each of the DC busses being configured to distribute the DC to the DC loads on its respective floor;
   at least one AC bus configured to supply AC to AC loads in the building; and
   at least one DC uninterruptible power supply (UPS) coupled to the per-floor DC busses for maintaining a predetermined DC voltage on each of the per-floor DC busses in the event of an AC power interruption, wherein the at least one DC UPS comprises a plurality of per-floor DC UPSs, each per-floor DC UPS configured to maintain the predetermined DC voltage on its respective floor in the event of an AC power interruption, wherein each per-floor DC UPS includes a battery having a controlled connection to the DC bus supplying the DC loads on its respective floor, and wherein the controlled connection includes a pair of silicon controlled rectifier (SCR) devices connected in parallel with each other, a switch connected in series with the SCR devices between the battery and the DC bus, and a controller for controlling operation of the SCR devices and the switch to control the connection of the battery to the DC bus and to control charging of the battery.

2. The hybrid AC/DC distribution system of claim 1 comprising a centralized inverter configured to convert DC to AC for the building and to supply AC loads within the building via the at least one AC bus.

3. The hybrid AC/DC distribution system of claim 1 comprising a plurality of per-floor inverters, each per-floor inverter configured to convert the DC to AC on its respective floor and to supply plural AC loads on its respective floor via the at least one AC bus.

4. The hybrid AC/DC distribution system of claim 1 wherein the at least one AC bus is configured to connect to an external AC supply.

5. The hybrid AC/DC distribution system of claim 1 wherein the controller controls the SCR devices and the switch to pre-charge the battery before connecting the UPS to the DC bus to a minimum battery voltage level that the DC loads can accept and to limit maximum charging current.

6. The hybrid AC/DC distribution system of claim 1 wherein the controller controls the SCR devices and the switch to allow charging of the battery from the per-floor rectifier when an indication of DC load is below a threshold.

7. The hybrid AC/DC distribution system of claim 1 wherein the controller is configured to control the SCR devices and the switch to connect the battery to the DC bus to supply DC from the battery to the DC bus in the event of an AC power interruption.

8. The hybrid AC/DC distribution system of claim 1 wherein the controller is configured to control the SCR devices and the switch to operate in a recovery mode after AC power is restored from an interruption to control the per-floor rectifier to supply the DC loads and to charge the battery to a minimum DC voltage.

9. The hybrid AC/DC distribution system of claim 1 wherein the controller is configured to control the SCR devices and the switch to operate in a battery idle mode during normal load conditions where the SCR devices are non-conductive and the battery is thereby isolated from the DC bus.

10. The hybrid AC/DC distribution system of claim 1 wherein the controller is configured to control the SRC devices and the switch to connect the battery to the DC bus during heavy load conditions to reduce DC voltage ripple on the DC bus.

11. A hybrid alternating current (AC)/direct current (DC) distribution method for multiple-floor buildings, the method comprising:
   rectifying supply side AC to DC using a plurality of per-floor rectifiers configured to convert the supply side AC to DC on its respective floor of a multiple floor building and to supply a plurality of DC loads on its respective floor;
   distributing, using a plurality of per-floor DC buses, the DC to the DC loads; and
   supplying AC power to AC loads in the building; and
   maintaining a predetermined DC voltage level on the per-floor DC busses in the event of an AC power interruption, wherein maintaining the predetermined DC voltage level on the per-floor DC busses comprises providing a plurality of per-floor uninterruptible power supplies (UPSs), each per-floor UPS being configured to maintain the predetermined DC voltage on its respective floor in the event of an AC power interruption, wherein each per-floor UPS includes a battery having a controlled connection to the DC bus on its respective floor during charging and discharging, and wherein maintaining the predetermined DC voltage level on the per-floor DC busses comprises providing a pair of silicon controlled rectifier (SCR) devices connected in parallel with each other, a switch connected in series with the SCR devices between the battery and each per-floor DC bus, and a controller for controlling operation of the SCR devices and the switch to control the connection of the battery to the DC bus and to control charging of the battery.

12. The hybrid AC/DC distribution method of claim 11 wherein supplying AC power to the AC loads includes converting the DC to AC utilizing a centralized inverter that converts DC to AC and wherein the AC bus supplies AC to a plurality of floors in the building.

13. The hybrid AC/DC distribution method of claim 11 wherein supplying AC power to the AC loads includes converting the DC to AC utilizing a plurality of per-floor inverters, each per-floor inverter converting the DC to AC on its respective floor and supplying plural AC loads on its respective floor.

14. The hybrid AC/DC distribution system of claim 11 wherein supplying AC power to the AC loads includes connecting the AC loads to an external AC power supply.

15. The hybrid AC/DC distribution method of claim 11 wherein maintaining the predetermined DC voltage level on the per-floor DC busses comprises controlling the SCR devices and the switch to pre-charge the battery before connecting the UPS to the DC bus to a minimum battery voltage level that the DC loads can accept and to limit maximum charging current.

16. The hybrid AC/DC distribution method of claim 11 wherein maintaining a predetermined DC voltage level on the per-floor DC busses comprises controlling the SCR devices and the switch to allow charging of the battery from the at least one rectifier when an indication of DC load is below a threshold.

17. The hybrid AC/DC distribution method of claim 11 wherein maintaining the predetermined DC voltage level on the per-floor DC busses comprises controlling the SCR devices and the switch to connect the battery to the DC bus to supply DC from the battery to the DC bus in the event of an AC power interruption.

18. The hybrid AC/DC distribution method of claim 11 wherein maintaining the predetermined DC voltage level on the per-floor DC buses comprises controlling the SCR devices and the switch to operate in a recovery mode after AC power is restored from an interruption to control the at least one rectifier to operate in its maximum power capability to supply the DC loads and to charge the battery to a minimum DC voltage.

19. The hybrid AC/DC distribution method of claim 11 wherein maintaining the predetermined DC voltage level on the per-floor DC busses comprises controlling the SCR devices and the switch to operate in a battery idle mode during normal load conditions where the SCR devices are non-conductive and the battery is thereby isolated from the DC bus.

20. The hybrid AC/DC distribution method of claim 11 wherein maintaining the predetermined DC voltage level on the per-floor DC busses comprises controlling the SRC devices and the switch to connect the battery to the DC bus during heavy load conditions to reduce DC voltage ripple on the DC bus.

21. The hybrid AC/DC distribution method of claim 11 embodied as a plurality of machine-readable instructions stored on a non-transitory computer readable storage medium and configured to be executed by at least one computer processor to perform the method.

22. The hybrid AC/DC distribution system of claim 1 wherein the per-floor rectifiers include one rectifier for each floor in the multiple floor building.

23. The hybrid AC/DC distribution method of claim 11 wherein the per-floor rectifiers include one rectifier for each floor in the multiple floor building.

* * * * *